April 21, 1925.
W. C. WHITE
1,535,004
TRAIN PIPE COUPLING
Filed Feb. 14, 1920  2 Sheets-Sheet 1
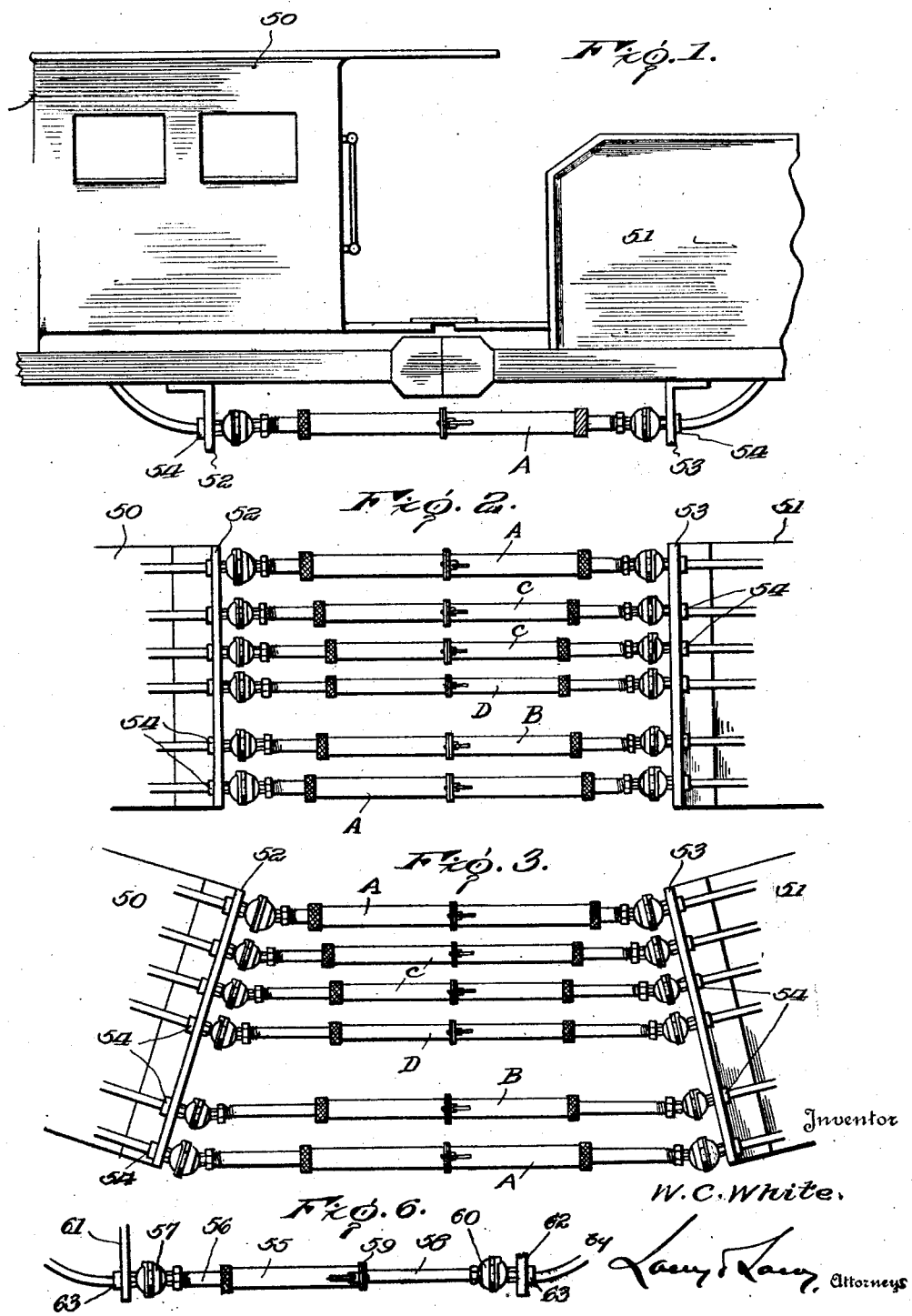

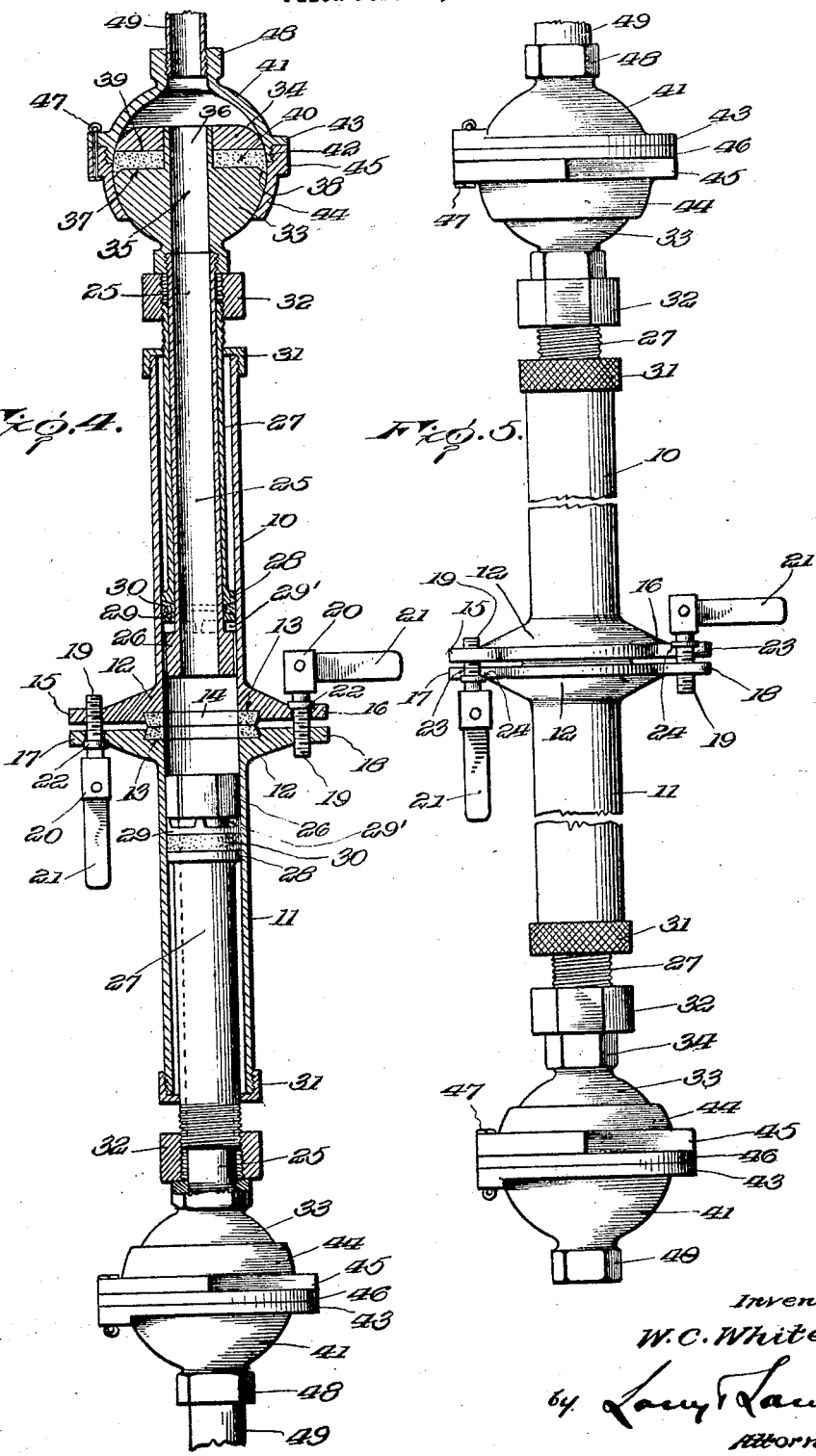

Patented Apr. 21, 1925.

1,535,004

UNITED STATES PATENT OFFICE.

WALTER C. WHITE, OF PITTSBURGH, PENNSYLVANIA, ASSIGNOR TO INTERNATIONAL COUPLERS COMPANY, OF PITTSBURGH, PENNSYLVANIA.

TRAIN-PIPE COUPLING.

Application filed February 14, 1920. Serial No. 358,626.

*To all whom it may concern:*

Be it known that I, WALTER C. WHITE, citizen of the United States, residing at Pittsburgh, in the county of Allegheny and State of Pennsylvania, have invented certain new and useful Improvements in Train-Pipe Couplings, of which the following is a specification.

This invention relates to an improved train pipe coupling, being particularly designed for use as a coupling between a locomotive and its tender, the invention having as one of its principal objects to provide a coupling adapted to supplant the usual flexible hose and wherein proper compensation will be made for all relative movement of the locomotive and tender arising under running conditions thereof.

The invention has as a further object to provide a coupling wherein the body thereof will always lie straight extending between the locomotive and tender so that abrupt elbows and tortuous passages or bending hose and pipes may be eliminated and sagging between the connecting pipes of engine and tender may be avoided to thus insure a free flow of fluid through the coupling.

The invention has as a further object to provide a coupling wherein a local universal movement will be had both at the point of connection of the coupling with the engine and with the tender or, in other words, at opposite ends of the coupling, and wherein a local telescopic movement may also be had at opposite end portions of the coupling.

And the invention has as a still further object to provide a coupling wherein the body thereof will be formed of corresponding sections and wherein said sections will be detachably joined by a service connection so that, when desired, the sections of the several couplings between an engine and tender may be readily freed so that the engine may thus be easily disconnected from its tender.

Other and incidental objects will appear hereinafter. In the drawings:

Figure 1 is a fragmentary side elevation showing the use of my improved coupling in connection with an engine and tender of conventional design, Figure 2 is a fragmentary bottom plan view showing the arrangement of the several couplings as employed between the engine and tender, Figure 3 is a view similar to Figure 2 and showing the action of the coupling when the engine and tender are rounding a curve, Figure 4 is a fragmentary sectional view more particularly illustrating the details of construction of the coupling, Figure 5 is a plan view of the coupling, and Figure 6 is a fragmentary bottom plan of a slightly modified form of coupling.

In carrying the invention into effect, my improved coupling is formed with a tubular body which is constructed of sections 10 and 11 respectively. Detachably connecting these sections at their confronting ends is a service connection or coupling of the type illustrated in my co-pending application filed October 21, 1919, Serial No. 332,177. The term service connection, as used in the present instance, is intended to designate a connection which is adapted to be readily operated manually for coupling or uncoupling the sections of the body of the device. In other words, this term is intended to distinguish over any coupling of a type which is so constructed that the coupling is intended to be only seldom, if ever, operated to free the elements which it connects. The service connection includes mating heads 12 which are formed on the body sections 10 and 11 respectively and are provided with concentric annular seats 13 which are undercut to receive and retain approved packing gaskets 14. These gaskets project beyond the end faces of the heads so that when the heads are brought together the gaskets will abut and compress to provide a sealed joint between the sections. Projecting from the heads at opposite sides thereof are diametric radial lugs which, for convenience, have been indicated at 15, 16, 17 and 18 respectively. Threaded through the lugs 15 and 18 are oppositely presented coupling studs 19 lying in parallel relation to the axis of the body and provided with heads 20 upon which are pivoted handles or operating levers 21. Formed on said studs are annular shoulders or collars 22. The lugs 16 and 17 are, as particularly shown in Figure 5, provided with slots 23 opening through corresponding edges of said lugs and formed in the outer faces of the lugs around the inner ends of said slots are arcuate sockets 24 opening into the slots. As will be observed, the coupling studs are received within the slots, it being merely necessary to axially rotate one of the body sections with respect to the other to engage the studs within the slots when the studs are then adjusted to tightly bind the coupling heads together and rigidly connect the sections of the coupling body. Adjustment of the studs will serve to seat the shoulders 22 in the sockets 24. These shoulders will coact with the walls of the sockets for locking the sections of the body against counter-rotation one with respect to the other. Moreover, by swinging the handles or turning levers 21 into angular relation to the coupling studs, these handles or levers will be disposed for engagement with the sections 10 and 11 respectively to prevent counter-rotation of the studs. A secure and fluid-tight joint is thus obtained. However, the connection may, at the same time, be readily operated in a manner which it is believed will be apparent in view of the foregoing description, for disconnecting the sections of the coupling body.

Telescopically fitted into the outer end portions of the coupling body are oppositely presented tubular joint stems or pipes 25. At their inner ends these stems are provided with annular heads 26 snugly engaging within the body sections and formed in their peripheries with suitable fluid passages. Slidably fitting over the stems 25 to extend within the outer end portions of the coupling body sections are follower sleeves 27. At their inner ends these sleeves are formed with annular heads 28 snugly fitting within the body sections and provided with beveled end faces sloping away from the heads 26. Interposed between each pair of heads 26 and 28 is a spacer ring 29. These rings also fit snugly within the body sections and are provided with depending lugs engaging the heads 26 and supporting the rings in spaced relation thereto to define air chambers 29'. between the rings and said heads. Formed on the rings are beveled faces confronting and sloping away from the beveled faces of the heads 28 and interposed between each pair of these beveled faces is a packing ring or gasket 30. Threaded upon the outer ends of the body sections 10 and 11 are caps 31 slidably receiving the follower sleeves 27 therethrough and threaded upon the outer ends of said sleeves are adjusting nuts 32.

Mounted upon the outer ends of the joint stems 25 are universal joints of the ball and socket type. Each of these joints includes a sectional ball comprising a substantially semispherical body section 33 and a cap section 34 substantially conforming to the spherical contour of the body section. Formed on the body section is a nipple threaded upon the outer end of the adjacent joint stem so that the stem communicates with a fluid passage 35 through the ball. Surrounding the inner end portion of this passage is an annular flange or guide 36 rising from the flat face 37 at the inner end of the body section. The face 37 lies at substantially right angles to the axis of the passage 35 and surrounding said face at the periphery of the section is a beveled shoulder 38 sloping away from the cap section 34. This cap section is provided with a central bore which snugly but slidably receives the flange 36 therethrough and formed on said section is a flat inner end face 39 confronting the face 37 of the body section in substantially parallel relation. Interposed between these faces is a compressible packing 40 of approved material. This packing snugly fits around the flange 36 and at its outer margin overlies the shoulder 38. In this connection it will be observed that the packing is of a thickness to complete the spherical shape of the ball and, at its peripheral edge conforms to the contour thereof. Snugly receiving the ball is the socket therefor. This socket includes a socket cup 41 provided with an annular flange 42 at the inner end of which is arranged a radial stop shoulder 43. Threaded upon said flange is an annular socket nut 44 conforming in contour to the contour of the cup and provided with an enlarged wrench receiving portion 45 surmounted, as particularly shown in Figure 5, by an annular flange 46 abutting the shoulder 43. At one side this shoulder is provided with an enlargement and removably engaged through said enlargement, the shoulder, the flange 46, and the wrench receiving portion of the nut, is a key 47 locking the cup and nut together. The inner faces of the cup and nut are machined so that close fitting contact will be had between the cup and nut. Since the cap section 34 of the ball is free to move with respect to the body section 33, this cap section is adapted to provide a follower for the packing 40. Fluid pressure will, therefore, act against this follower for compressing the packing and feeding it to the wall of the socket to provide a sealed joint between the ball and the socket. The shoulder 38 upon the body section of the ball will, of course, assist in the feeding action of the packing and, owing to the presence of this shoulder a correspondingly increased packing area will be presented to the socket wall. Formed on the socket cup 41 is a nipple 48 adapted to receive a threaded train pipe as conventionally shown at 49.

It is now to be observed that the follower sleeves 27 terminate at their outer ends considerably short of the outer ends of the joint stems 25 and that said sleeves are, at their outer end portions, threaded for a considerable distance. Consequently, by rotating the adjusting nuts 32 until said nuts lie flush at their outer ends with the outer ends of said sleeves, the projecting ends of the joint stems will then provide wrench receiving portions between the outer ends of the sleeves and the nipples 34 of the body sections of the joint balls. Accordingly, a wrench may then be readily engaged with either joint stem for holding the stem stationary while the body section of its ball and socket joint is rotated thereon and thus connected thereto. This feature has been found of extreme advantage in practical use since the operation of assembling the coupling is, as will be at once apparent, thus greatly facilitated. Normally, the nuts 32 are positioned upon the joint sleeves 27 to abut the nipples of the ball and socket joints and, as will be clear, by properly adjusting these nuts, the joint sleeves may be advanced for compressing the packing gaskets 30 between the beveled faces of the heads 28 and rings 29 and expanding the gaskets into tight frictional contact with the walls of the body sections 10 and 11 as well as the walls of the joint stems 25 for thus providing sealed joints between the coupling body and said stems. Moreover, fluid under presure will enter through the passages in the heads 26 of the joint stems to act against the rings 29 for advancing these rings. The rings will thus also provide followers for the gaskets constantly acting thereon, under the influence of the fluid pressure, for compressing the gaskets between the joint stems and the sections of the coupling body. Constantly sealed joints between the joint stems and the body of the coupling will thus further be insured.

In Figures 1, 2 and 3 of the drawings, I have shown a plurality of my improved couplings as employed in actual use in connection with a locomotive and tender, the locomotive and tender, however, being only conventionally illustrated. Beneath the locomotive is suitably mounted an angle iron 52 and confronting this angle iron normally in parallel relation is a similar angle iron 53 suitably mounted beneath the tender. The couplings are mounted to extend horizontally between these angle irons and are supported thereby, six couplings in all being usually provided and arranged in spaced parallel relation. The couplings are, of course, respectively connected at their ends with the proper train pipes which are fitted through the angle irons and carry, at the inner sides of the angle irons, annular shoulders 54 designed to resist pulling strain of the couplings. The two outermost couplings, indicated at A in Figures 1, 2 and 3, connect the water pipes of the engine and tender. These couplings are of equal size and are the largest of all the couplings. Next smaller is the coupling B connecting the steam pipes of the locomotive and tender. Next smaller than the steam pipe coupling are the couplings C connecting the air brake pipes, two air brake pipe couplings being employed as in the instance of the water pipe couplings. The smallest coupling of all is the coupling D connecting the air signal pipe of the locomotive and tender.

It is now to be observed that all the couplings are supported to extend without drop or sag straight between the locomotive and tender so that constant flow of fluid through the couplings will thus be unhampered. The universal joints of the couplings lying adjacent the locomotive will localize the major portion of the lateral and vertical movement of the locomotive relative to the tender. In like manner, the universal joints of the couplings lying adjacent the tender will localize the major portion of the lateral and vertical movement of the tender relative to the locomotive. Moreover, telescopic movement of the locomotive joint stems in the forward sections of the coupling bodies will tend to localize relative longitudinal movement of the locomotive with respect to the tender and, in like manner, telescopic movement of the tender joint stems in the rear sections of the coupling bodies, will tend to localize longitudinal movement of the tender with respect to the locomotive. However, it is to be noted, as particularly brought out in Figure 3, that when the locomotive and tender are rounding a curve, the telescoping joint stems of the respective couplings will cooperate in their movement to compensate for the deflection of the locomotive and tender with respect to each other. The joint stems of the innermost couplings will be moved inwardly toward each other somewhat. On the other hand, the joint stems of the remaining couplings will, in degree increasing with each coupling, be moved outwardly so that notwithstanding the deflection of the locomotive and tender the coupling bodies will, nevertheless, substantially maintain their parallelism. The coupling bodies are graduated in length to accommodate the increased telescopic movement necessary for the stems of the couplings lying nearer the sides of the locomotive and tender. It will accordingly be seen that the several couplings will operate to properly compensate for all usual relative movement of the locomotive and tender while, at the same time, forming sealed connections providing for a free fluid flow therethrough.

As will be observed upon particular reference to Figure 1, the couplings are of such length that the service connections of the coupling bodies are arranged midway between the locomotive and tender or in a plane with the coupling between the locomotive and tender. Thus, ready access to these service connections may be had so that, when desired, the sections of the respective coupling bodies may be disconnected from each other when the locomotive may be readily uncoupled from its tender. The striking advantage of this arrangement will be at once apparent since, as will be seen, the locomotive may thus be uncoupled from the tender whenever found expedient or necessary.

In Figure 6 of the drawings, I have illustrated a slightly different form of coupling wherein a coupling body 55 is employed. This coupling body corresponds to either of the sections 10 or 11 of the coupling of the preferred construction and telescoping therein is a stem 56 and sleeve, this stem and sleeve corresponding to one of the stems 25 and sleeves 27 and being mounted in a similar manner. Upon the outer end of the stem is a universal joint 57 of the type previously described. Extending from the inner end of the coupling body is a pipe 58 detachably secured to the body by a service connection 59 of the type previously described. At its outer end said pipe carries a universal joint 60 corresponding to the joint 57. Thus, as suggested in this figure, the modified form of coupling may be arranged to extend between angle irons 61 and 62 respectively of a locomotive and tender, these angle irons corresponding to the angle irons 52 and 53 and receiving train pipes therethrough to which the universal joints are connected and which carry annular shoulders 63 for resisting pulling strain of the coupling. The universal joints will, of course, compensate for lateral and vertical movement of the engine relative to the tender while the joint stem 56 will telescope within the body 55 to compensate for longitudinal movement of the engine relative to the tender. To detach the engine from the tender it will simply be necessary to release the service connection 59. This modified form of coupling, therefore, also provides a highly efficient construction.

Having thus described the invention, what is claimed as new is:

1. A train pipe coupling including a coupling body, a pipe section slidably fitted therein, a packing which bears between said pipe section and the coupling body, a follower for the packing having a sleeve surrounding said pipe section, stop means at the outer end of said pipe section, and means adjustable upon the sleeve of said follower to coact with said stop means for advancing the follower against said packing, the sleeve of the follower terminating short of said stop means and said adjustable means being movable to a position upon the follower sleeve for exposing the outer end portion of the pipe section whereby a wrench may be engaged with the pipe section between the follower sleeve and said stop means.

2. In a train pipe coupling, a coupling body, a joint stem slidably fitting therein and projecting at one end of the body, a follower sleeve fitting over said stem, and a packing which bears between the stem and the body, limited by said sleeve and exposed to the pressure of a fluid in the body for maintaining a sealed joint between the body and said stem.

3. In a train pipe coupling, a coupling body, a joint stem slidably fitting therein and projecting at one end of the body, a follower sleeve fitting over said stem, a packing which bears between the stem and the body, limited by said sleeve, and means to coact with the packing exposed to the pressure of a fluid in the body for compressing the packing and maintaining a sealed joint between the body and said stem.

4. In a train pipe coupling, a coupling body, a joint stem slidably fitting therein and projecting at one end of the body, a follower sleeve fitting over said stem, a packing which bears between the stem and the body, limited by said sleeve and exposed to the pressure of a fluid in the body for maintaining a sealed joint between the body and said stem, and means carried by the outer end of the sleeve to cooperate with an abutment on the outer end of said stem for limiting the sleeve against axial movement.

5. In a train pipe coupling, a coupling body, joint stems slidably fitting therein and projecting at opposite ends of the body, follower sleeves fitting over said stems, packings which bear between the stems and the body, limited by said sleeves and exposed to the pressure of a fluid in the body for maintaining sealed joints between the body and said stems, means carried by the outer ends of the sleeves to cooperate with abutments on the outer ends of said stems for limiting the sleeves against axial movement, the coupling body being formed of sections, and a service connection uniting said sections.

6. In a train pipe coupling, a coupling body, a joint stem slidably fitting therein, a follower sleeve slidably fitting over said stem, a packing which bears between the stem and the body, limited by the sleeve and exposed to the pressure of a fluid in the body for maintaining a sealed joint between the body and said stem, and means carried by the outer end of the sleeve to cooperate with an abutment on the outer end of the stem and adjustable for shifting the sleeve axially and compressing said packing.

7. In a train pipe coupling, a coupling body, a joint stem slidably fitting therein and provided at its inner end with a head having fluid passages, a follower sleeve fitting over said stem, a packing which bears between the stem and body, limited by said sleeve and exposed to the pressure of a fluid in the body entering through said passages for maintaining a sealed joint between the body and said stem, and means spacing the packing with respect to the head.

8. In a train pipe coupling, the combination with a pair of universal joints having stems extending therefrom, of a coupling body slidably receiving said stems, follower sleeves surrounding the stems and limited against endwise movement by the joints, and packings which bear between the stems and the body, limited by said sleeves and exposed to the pressure of a fluid in the body for maintaining sealed joints between the body and said stems.

9. In a train pipe coupling, the combination with a joint stem, and an abutment carried thereby, of a coupling body slidably receiving said stem, a follower sleeve surrounding the stem limited against endwise movement by said abutment, and a packing which bears between the stem and body, limited by said sleeve and exposed to the pressure of a fluid in the body for maintaining a sealed joint between the body and said stem.

10. In a train pipe coupling, the combination with a pair of universal joints having stems extending therefrom, of a coupling body slidably receiving said stems, follower sleeves surrounding the stems and limited against endwise movement by the joint, packings which bear between the stems and the body, limited by said sleeves, and packings in said joints, all of said packings being exposed to the pressure of a fluid flowing through the joints, the body and said stems for compressing the packings.

11. In a train pipe coupling, the combination with a universal joint having a stem extending therefrom, of a coupling body slidably receiving said stem, a follower sleeve surrounding the stem, a packing which bears between the stem and the body, limited by said sleeve, and a packing in said joint, both of said packings being exposed to the pressure of a fluid flowing through the joint, the body and said stem for compressing the packing.

In testimony whereof I affix my signature.

WALTER C. WHITE. [L. S.]